United States Patent [19]

Wang

[11] Patent Number: 4,854,718
[45] Date of Patent: Aug. 8, 1989

[54] MANUAL BLENDERS

[76] Inventor: Yen-Flui Wang, No. 1, Lane 182, Sin-E St., Yun-Kang District, Tainen Hsien, Taiwan

[21] Appl. No.: 204,517

[22] Filed: Jun. 9, 1988

[51] Int. Cl.$^4$ ............................................. B01F 7/20
[52] U.S. Cl. ................................... 366/252; 366/325
[58] Field of Search .............. 366/130, 244, 247, 248, 366/252, 253, 254, 325, 347, 245, 246, 249, 250, 251, 279, 97, 98, 129, 283, 282, 281; 416/76, 77; 34/58; 74/413; 99/348, 352

[56] References Cited

U.S. PATENT DOCUMENTS

| | | | |
|---|---|---|---|
| 314,322 | 3/1885 | Fisk | 366/325 X |
| 352,811 | 11/1886 | Dike et al. | 366/253 |
| 499,741 | 6/1893 | Juergens | 366/245 |
| 936,410 | 10/1909 | Chase et al. | 366/246 |
| 964,306 | 7/1910 | Otten | 366/245 |
| 993,821 | 5/1911 | Brown | 366/98 |
| 3,415,497 | 12/1968 | Johnson | 366/247 |
| 4,065,811 | 12/1977 | Pauty | 366/244 |

FOREIGN PATENT DOCUMENTS

| | | | |
|---|---|---|---|
| 2500444 | 7/1975 | Fed. Rep. of Germany | 366/246 |
| 2653679 | 6/1977 | Fed. Rep. of Germany | 366/130 |

Primary Examiner—Harvey C. Hornsby
Assistant Examiner—Scott J. Haugland
Attorney, Agent, or Firm—Bacon & Thomas

[57] ABSTRACT

An improved manual blender comprises a circular vessel body having a spout; a lid suitable for covering the vessel body; a spinning means with a knob, which facilitates the manual spin, and an annular gear formed circumferentially in an inner side wall thereof; and a masher means having an axle, a pair of opposite bent arms, beating rod members properly disposed on the axle and bent arms, and a gear coaxially provided on the top portion of the axle, eccentrically engaged with the annular gear of the spinning means as the masher means is coaxially and rotatably installed in the circular vessel body between the lid and the vessel body.

2 Claims, 3 Drawing Sheets

MANUAL BLENDERS

BACKGROUND OF THE INVENTION

1. Field of the Invention

This invention relates to the design and construction of a manual blender.

2. Prior Art

Conventionally, the domestic mixers or blenders can be generally distinguished into two types of manual ones and electric-powered ones. The manual mixer or blender includes a vessel and a fork for beating the materials contained in the vessel to a paste or the like, and it is labor consuming in operation. The mixers or blenders of electric power are popular due to their easy operations, yet it is useless without electricity.

SUMMARY OF THE INVENTION

Accordingly, it is an object of the present invention to provide an improved manual blender for domestic usage which will overcome the disadvantages noted heretofore.

The foregoing objectives are achieved according to this invention through the provision of a manual blender which comprises a circular vessel body having a spout; a lid suitable for covering the vessel body; a spining means with a knob, which facilitates the manual spin, and an annular gear formed circumferentially in an inner side wall thereof; and a masher means having an axle, a pair of opposite bent arms, beating rod members properly disposed on the axle and the bent arms and a gear coaxially provided on the top portion of the axle, eccentrically engaged with the annular gear of the spinning means as the masher means is coaxially rotatably installed in the circular vessel body between the lid and the vessel body.

DETAILED DESCRIPTION OF THE PREFERRED EMBODIMENT

The following is a detailed description of the best presently contemplated embodiment of the invention. This description is not to be taken in a limiting sense, but is made merely for the purpose of illustrating the general principles of the invention.

Figure 1:
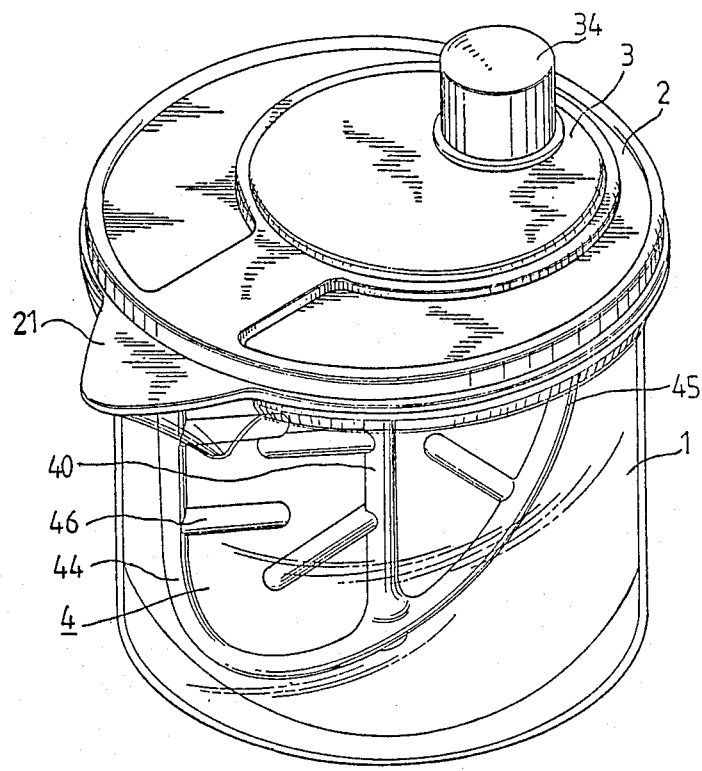
FIG. 1 is a perspective view of a manual blender in assembled condition according to the present invention.
Figure 2:
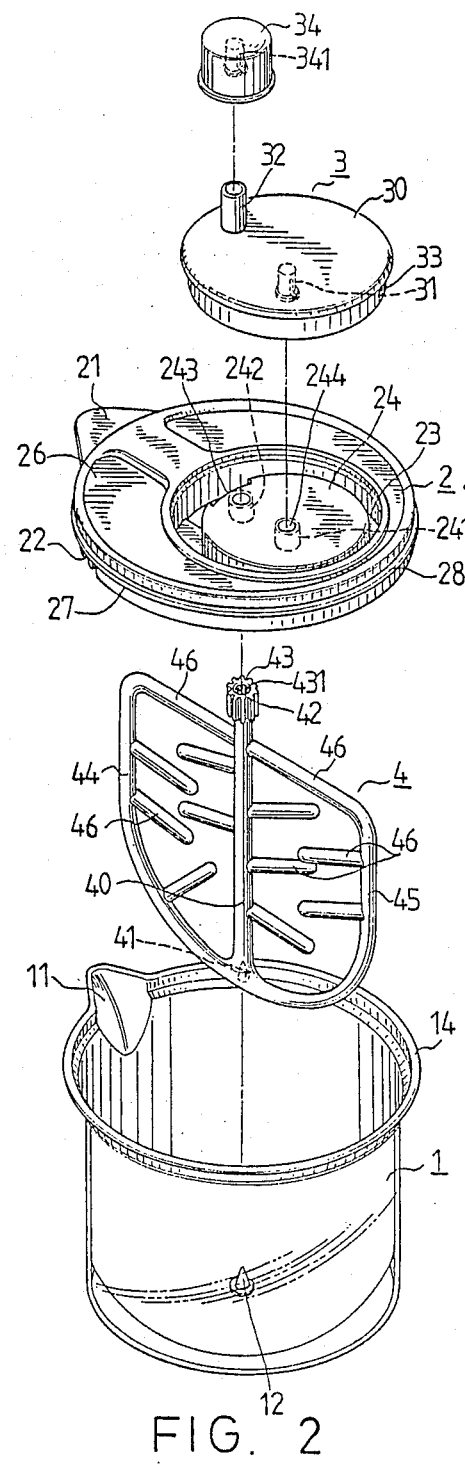
FIG. 2 is an exploded and perspective view of the manual blender shown in FIG. 1.
Figure 3:
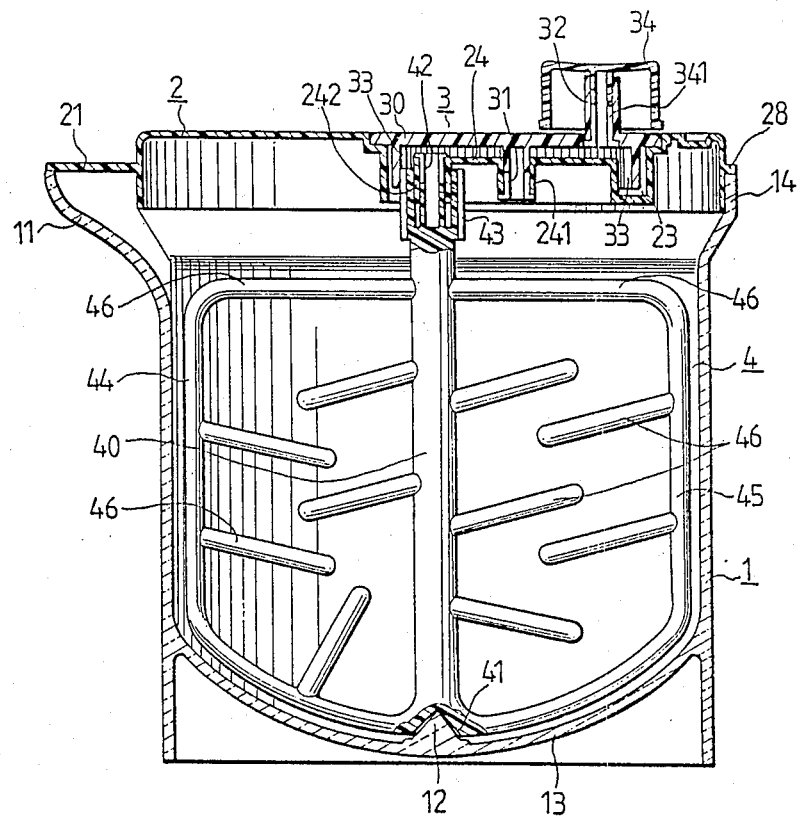
FIG. 3 is a sectional view of the manual blender shown in FIG. 1.

Referring to FIGS. 1, 2 and 3, a manual blender of the present invention comprises a cylindrical vessel body 1, a lid 2 suitable for closing the space defined by said vessel body 1, a masher means 4 adapted to be driven to revolve in the vessel body 1, and a spinning means 3 manually operated to drive said masher means 4.

Said vessel body 1, which is preferably made of transparent material, is provided with a rim 14 on its circular side wall, a spout 11 extending upwardly and outwardly, a concave basement 13 for gathering the the beaten material and a cone-shaped projector 12 integrally formed on the central portion of the basement.

Said lid 2 includes a circular plate 26 and a circumferential wall 27 extending downwardly from the periphery of the plate 26 with an outer periphery corresponding to the inner side wall of the rim 14 of the vessel body 1, a circular recess 23 eccentrically located in the plate 26, a hollow circular plateform 24 with a perforation 244 located in the central portion, coaxially disposed in the recess 23, a first sleeve member 241 axially disposed under the platform 24 at the central portion thereof with a socket hole communicating with said perforation 244, a second sleeve member 242 axially disposed under the platform 24 at the central portion of the plate 26, an opening 243 adjacent to said second sleeve member 242, formed in a section of the circumferential wall of the platform 24, a flange 28 extending outwardly, located circumferentially on said circumferential wall 27, a tongue plate 21 extending outwardly for covering the spout 11, integrally formed on the flange 28, and at least a slot 22 communicating the aligned spout 11 and the space defined by the vessel body 1, formed in the circumferential wall 27 below the flange 28.

Said spinning means 3 includes a disc 30, a circumferential wall 33 with an annular gear 331 circumferentially formed in the inner side wall thereof extending downwardly from the outer bottom of the disc 30, a plug member 31 for rotatably inserted in the socket hole of the first sleeve member 241 through the perforation 244, centrally disposed under the disc 30, a sleeve member 32 eccentrically projected on the disc 30 and a knob member 34 having a plug member 341 extending downwardly for rotatably inserting in the second sleeve member 32.

Said masher means 4 includes an axle 40 with a plurality of beating rod members 46 projected outwardly and a pair of opposite bent arms 44, 45 with a plurality of beating rod members 48 being axially staggered with respect to the adjacent beating rod members 46 disposed on the axle 40, substantially opposite projected thereon. A cone-shaped cavity 41 is formed in the lower end of the axle 40 for receiving said cone-shaped projector 12, and a gear 43, having a recess and an inner pole piece 42 axially projected in the recess with a circular gap 431 formed between the inner pole piece 42 and the side of the recess.

In assembling, as particularly shown in FIG. 3, the knob 34 is rotatably connected to the circular plate 30 by inserting the plug member 341 into the sleeve means 32 and the spinning means 3 is rotatably connected over the circular platform 24 of the lid 2 by inserting the plug member 31 into the sleeve member 241 through the central perforation 244. Then the second sleeve member 242 is socketed in the circular gap 431 of the gear 43 of the masher means 4 where the gear 43 is engaged with the annular gear 331 of the spinning means 3 through the opening 243 of the platform 24 and the masher means 4 is also supported by the cone-shaped projector 12 resided in the cavity 41 where the tip of the projector 12 centrally contacting the lower end of the axle 40 as the lid 2 is mounted on the vessel body 1.

In operation, one can drive the spinning means 3 manually by holding the knob 34, and the masher means 4 is driven to revolve through the engaged gears 331, 43. It is to be noted that the teeth of the annular gear 311 can be arranged e.g. four times as much as that of the gear 43, it means that there will be four revolutions of the masher means 4 for each revolution of the spinning means 3.

It can be seen that the manual blender according to the present invention is simplified in assembly without tool and also easy in operation. Furthermore, it can be used in any place regardless of electric power source.

As will be evident to those skilled in the art, modifications of the present invention can be made in view of the foregoing disclosure without departing from the spirit and scope of the invention.

What is claimed is:

1. A manual blender comprising:
   a vessel body for material storage having a spout formed in the upper portion;
   a lid suitable for closing the space defined by the vessel body including a plate and a first circumferential wall extending downwardly from the periphery of said plate with a circular recess eccentrically located in the plate and a hollow circular platform coaxially disposed in the recess, the platform including an open therethrough;
   a spinning means including a disc member and a second circumferential wall having an annular gear formed in an inner side of the wall, extending downwardly from the bottom of the disc member, a knob, means for eccentrically and rotatably securing the knob on the disc member and means for coaxially and rotatably securing the spinning means over the platform of the lid; and
   a masher means including an axle, a pair of oppositely disposed bent arms and essential beating rod members properly disposed on the axle and the bent arms, a gear engaged with the annular gear of the spinning means through said opening, coaxially provided on the top end of the axle and means for coaxially and rotatably securing the masher means under the lid and means for supporting it in the vessel body.

2. A manual blender as claimed in claim 1 wherein the vessel body has a concave basement for gathering the beaten material or materials.

* * * * *